March 20, 1934.  H. R. HALL  1,951,357
COFFEE TABLET
Filed Feb. 21, 1931
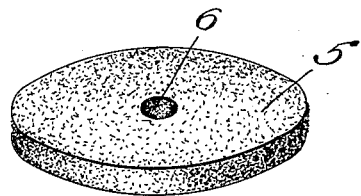
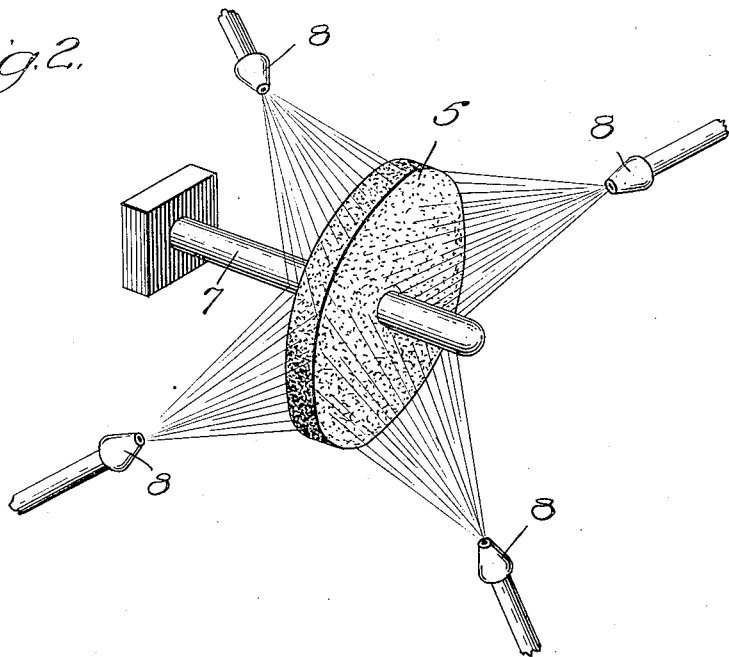
Inventor:
Howard R. Hall, Patented Mar. 20, 1934

1,951,357

UNITED STATES PATENT OFFICE 1,951,357

COFFEE TABLET

Howard R. Hall, Chicago, Ill.

Application February 21, 1931, Serial No. 517,590

11 Claims. (Cl. 99—11)

The present invention relates to improvements in the preparation of compressed coffee tablets and will be fully understood from the following description thereof, illustrated by the accompanying drawing, in which:

Figure 1 is a perspective view of a coffee tablet prepared in accordance with the present invention; and Fig. 2 is a diagrammatic view illustrating a stage in the preparation of the tablet.

Efforts have hitherto been made to prepare compressed tablets from ground coffee, coffee extracts and the like, using various binding materials, but, as produced hitherto, such tablets have not been successful in use. It is necessary that the tablets thus prepared have the particles of coffee contained in them satisfactorily bonded to permit commercial handling and also such handling as occurs in the hands of the consumer without breaking up, and nevertheless, the tablets or compressed cakes must rapidly disintegrate and break down in the coffee making process, to permit utilization of the coffee without excessive boiling or cooking such as to cause loss of its aromatic constituents. Notwithstanding the fact that the binder constituents employed must be readily and rapidly soluble, they must not be affected by normal atmospheric conditions nor permit the breaking down or disintegration of the tablets in an opened package, for example, in a humid atmosphere. As is obvious, the binder employed in the preparation of the tablets must be of such a character as not to affect the flavor or aroma of the coffee.

In accordance with the present invention, I have found that the necessary qualities can be secured in a coffee tablet by employing as a binder a combination of constituents, neither of which, alone, produces satisfactory results.

In preparing a coffee tablet in accordance with the present invention, I dissolve gelatin and dextrin or "British gum" in water or suitable aqueous liquid, such as a coffee brew or extract, or a brew or extract from coffee and chicory. Solutions of gelatin and dextrin may be prepared separately and mixed or the gelatin and dextrin may be simultaneously dissolved in the aqueous liquid. Thus, gelatin may be mixed with water or a coffee brew in the proportion of one part of gelatin to 6 to 12 parts of liquid (by weight) and the dextrin may be mixed separately with water or coffee brew in the proportion of 1 part of dextrin to 3 to 5 parts of coffee brew. The mixtures are allowed to stand for a time, and are then heated, suitably in a double boiler or over a water bath, to effect solution. The solutions are then mixed in such proportions that the mixture contains approximately equal parts of gelatin and dextrin, although the proportions of these constituents may vary widely; for example, the proportion of dextrin relative to gelatin may vary from one-half to two times the proportion of gelatin. Although not essential, it is preferred to include a small proportion of glucose, say to the amount of 10 to 20% of the total amount of gelatin and dextrin, this addition imparting additional flexibility to the bond and improving the capacity to withstand handling. A preferred formula, which I have found satisfactory in use, contains 2 parts by weight of gelatin, 2 parts of dextrin, 1 part of glucose and 15 to 16 parts of water or preferably, coffee brew. As is readily apparent, the proportion of the aqueous liquid may be widely varied, more being used if a thinner binder is desired and less being employed if a heavier or more adhesive binder is desired; or in the latter case, the initial mixture produced may be thickened by heating in a water bath or over a double boiler.

The liquid binder, containing gelatin and dextrin, is then thoroughly mixed with the ground coffee or coffee extract. This may be effected by spraying the solution of gelatin and dextrin upon the coffee while thoroughly mixing the latter. The proportion of the solution employed may be varied quite widely, say from 1 to 3 ounces per pound of coffee. In general, I have found approximately 2 ounces per pound of coffee to be satisfactory.

The ground coffee with the solution of gelatin and dextrin thoroughly incorporated therein is compressed to the desired tablet form; for example, to the form of a flat disk or annulus 5 having the central bore or opening 6 as shown in Fig. 1 of the drawing and in my prior application Serial No. 497,309, filed November 21, 1930.

The tablet thus formed is rapidly disintegrated in the coffee making process, but is substantially unaffected by ordinary atmospheric conditions and does not break down or disintegrate either in the package, after opening, or in normal handling prior to use. The original flavor of the coffee used in preparing the tablet is wholly unaffected and is retained to an unusual degree even on long exposure to the atmosphere, for example, in an open package.

In order to further assure the retention of flavor and aroma by the coffee contained in the tablets prepared in accordance with the present invention, they may be further protected by applying superficially a spray of the gelatin and dextrin solution, prepared, for example, as hereinbefore described. This may be accomplished, for example, by passing the tablet 5, supported upon a spindle 7 passing through the opening 6, as shown in Fig. 2, through sprays of the gelatin and dextrin solution, applied by means of the spray heads 8. Although in the initial mixing of the gelatin-dextrin solution used as a binder with the coffee, the particles thereof are superficially sealed and protected against escape of flavor and aroma, the subsequent superficial coating of the compressed tablet aids further in the retention of the flavor and aroma of the coffee. A spray of a solution of gum arabic may likewise be employed for the superficial coating, if desired.

It will be readily apparent that the invention may also be employed in preparing tablets or compressed cakes of coffee extractives and of coffee substitutes which are used in the manufacture of beverages in a manner similar to coffee.

I claim:

1. The method of forming a compressed coffee tablet, stable in the atmosphere and readily disintegrable in water, which comprises incorporating therewith as a binder, gelatin and dextrin, and compressing the mixture to the desired form.

2. The method of preparing a compressed coffee tablet, stable to the atmosphere and readily disintegrable in water, which comprises incorporating with ground coffee an aqueous liquid containing gelatin and dextrin, and compressing the mixture to the desired form.

3. The method of preparing a compressed coffee tablet, stable in the atmosphere and readily disintegrable in water, which comprises incorporating with ground coffee an aqueous solution containing gelatin, dextrin and glucose.

4. The method of preparing a compressed coffee tablet, stable in the atmosphere and readily disintegrable in water, which comprises incorporating with ground coffee an aqueous solution of extractives of coffee containing gelatin, dextrin and glucose.

5. A compressed coffee tablet, stable in the atmosphere and readily distintegrable in water, comprising a major proportion of coffee material and a minor proportion of a binder containing gelatin and dextrin intimately commingled therewith.

6. A compressed coffee tablet, stable in the atmosphere and readily disintegrable in water, which comprises a major proportion of ground coffee and a minor proportion of a binder containing gelatin and dextrin intimately commingled therewith.

7. A compressed coffee tablet, stable in the atmosphere and readily disintegrable in water, which comprises a major proportion of ground coffee and a minor proportion of a binder containing gelatin, dextrin and glucose, intimately commingled therewith.

8. A compressed coffee tablet, stable in the atmosphere and readily disintegrable in water, said tablet comprising a major proportion of ground coffee and a minor proportion of a binder containing gelatin and dextrin, and having a superficial coating comprising gelatin and dextrin.

9. A compressed coffee tablet, stable in the atmosphere and readily disintegrable in water, said tablet comprising a major proportion of ground coffee and a minor proportion of a binder containing gelatin and dextrin, and having a superficial coating comprising gum arabic.

10. The method of forming a compressed coffee tablet stable in the atmosphere and readily disintegrable in water, which comprises preparing an aqueous coffee extract, incorporating therewith ground coffee together with dextrin and gelatin as a binder, and compressing the mixture to the desired form.

11. A compressed coffee tablet stable in the atmosphere and readily disintegrable in water, comprising a major proportion of ground coffee material and a minor proportion of a binder containing gelatin and dextrin, said coffee material and said binder being intimately commingled with the evaporated residue of an aqueous coffee extract.

HOWARD R. HALL.